(12) United States Patent
Pusateri

(10) Patent No.: US 9,656,712 B2
(45) Date of Patent: May 23, 2017

(54) REMOVABLE STORAGE COMPARTMENT SYSTEM FOR BICYCLES

(71) Applicant: Julie Pusateri, North Hollywood, CA (US)

(72) Inventor: Julie Pusateri, North Hollywood, CA (US)

(73) Assignee: THE CLEVER STORE, LLC, Santa Rosa, CA (US)

( * ) Notice: Subject to any disclaimer, the term of this patent is extended or adjusted under 35 U.S.C. 154(b) by 44 days.

(21) Appl. No.: 14/874,463

(22) Filed: Oct. 4, 2015

(65) Prior Publication Data

US 2016/0096573 A1 Apr. 7, 2016

Related U.S. Application Data

(60) Provisional application No. 62/060,251, filed on Oct. 6, 2014.

(51) Int. Cl.
| | | |
|---|---|---|
| *B65D 43/03* | (2006.01) | |
| *B65D 55/00* | (2006.01) | |
| *B62J 7/00* | (2006.01) | |
| *B62J 9/00* | (2006.01) | |
| *B62J 11/00* | (2006.01) | |

(52) U.S. Cl.
CPC ..................... *B62J 9/005* (2013.01)

(58) Field of Classification Search
CPC ........................................................ B62J 9/005
USPC .................................. 220/781, 380; 224/442
See application file for complete search history.

(56) References Cited

U.S. PATENT DOCUMENTS

| | | | | |
|---|---|---|---|---|
| 4,573,595 A | * | 3/1986 | Mednis .............. | B65D 21/0237 206/509 |
| 5,031,807 A | * | 7/1991 | Tiffany ..................... | B62J 9/005 150/108 |
| 5,645,404 A | * | 7/1997 | Zelenak ..................... | A45F 3/16 222/175 |
| 5,961,018 A | * | 10/1999 | Abelbeck ................ | B62B 3/146 224/411 |
| 6,401,997 B1 | * | 6/2002 | Smerdon, Jr. ............ | B62J 11/00 224/414 |
| 7,393,125 B1 | * | 7/2008 | Lai ........................... | B62M 6/90 280/281.1 |
| D731,788 S | * | 6/2015 | Joo ................................ | D3/233 |
| 2007/0044877 A1 | * | 3/2007 | Davidoff ................ | A45C 1/024 150/113 |
| 2011/0121044 A1 | * | 5/2011 | Schopf ..................... | B62J 9/005 224/414 |
| 2012/0186656 A1 | * | 7/2012 | Fitzgerald ................. | A45F 3/04 137/1 |

(Continued)

*Primary Examiner* — Derek Battisti
(74) *Attorney, Agent, or Firm* — Justin Lampel

(57) ABSTRACT

A removable storage compartment system for bicycles is provided. The removable storage compartment system has a plurality of generally cylindrical containers wherein each of the individual containers is secured to another container or to the frame of the bicycle. The generally cylindrical individual containers may be insulated so as to allow a user to transport warm or cool items. Each of the plurality of individual storage compartments may be of different sizes so as to allow a user to best select the total desired storage area for the bicycle and to allow a user to store the individual storage compartments inside one another.

9 Claims, 3 Drawing Sheets

(56) References Cited

U.S. PATENT DOCUMENTS

| | | | | |
|---|---|---|---|---|
| 2012/0193382 A1* | 8/2012 | Wilson | ................... | B62J 99/00 224/414 |
| 2014/0123483 A1* | 5/2014 | Wilsey | ................... | B62M 6/90 29/825 |
| 2014/0329134 A1* | 11/2014 | Lang | ................... | B62M 6/90 429/156 |

* cited by examiner

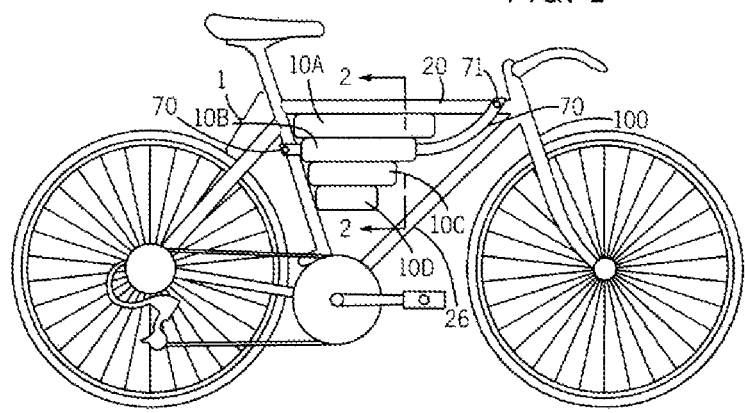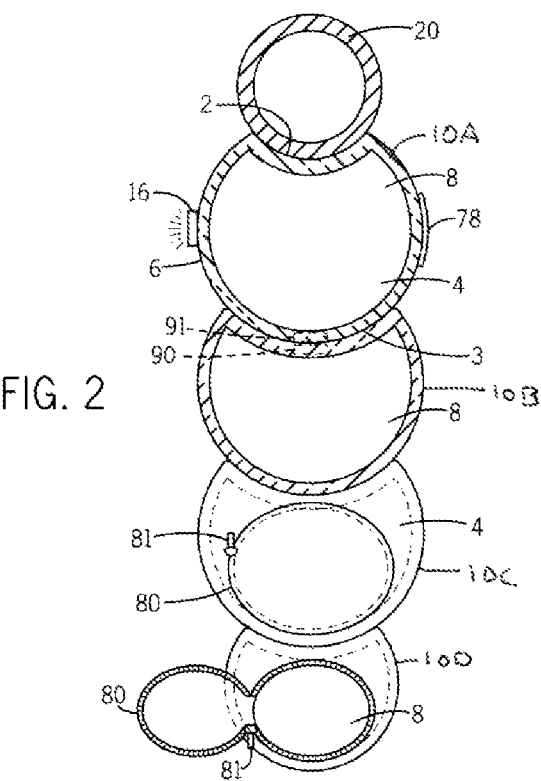

REMOVABLE STORAGE COMPARTMENT SYSTEM FOR BICYCLES

CROSS-REFERENCE TO RELATED APPLICATIONS

The following application is based on and claims the priority benefit of U.S. provisional application Ser. No. 62/060,251 filed Oct. 6, 2014; the entire contents of which are incorporated by reference.

BACKGROUND OF THE INVENTION

A removable storage compartment system for bicycles is provided. The removable storage compartment system has a plurality of generally cylindrical containers wherein each of the individual containers is secured to another container or to the frame of the bicycle. The generally cylindrical individual containers may be insulated so as to allow a user to transport warm or cool items. Each of the plurality of individual storage compartments may be of different sizes so as to allow a user to best select the total desired storage area for the bicycle and to allow a user to store the individual storage compartments inside one another.

Over the years, attempts have been made to provide a storage compartment for bicycles. For example, U.S. Pat. No. 8,757,413 to Kephart discloses a storage system relating to a removable carrier to hold items carried on a bicycle, preferably utilizing a standard-sized water-bottle cage. Further, U.S. Pat. No. 8,720,759 to Henderson discloses a bicycle accessory storage device and system. The device is comprised of an elongated bowl that is sized and shaped to mate to the bottom of a bicycle seat. The system includes the bowl and the bicycle seat.

Still further, U.S. Pat. No. 6,837,407 to Towers discloses a storage container intended for placement into standard water bottle holders often found on bicycles. The container has a door, which can be rotated open on a hinge. This can be done without removing the container from the water bottle holder. The container has a retention feature for keeping the door closed. The container provides the user with a storage space for such articles including, but not limited to sunglasses, personal identification, emergency information, money, credit cards, patch kits, tools, writing tools, computers, cell phones, food and first aid kits. The container's shape properly orients the container in the water bottle holder and prevents the container from rotating axially in the water bottle holder or from falling out under vibration. The container may be locked closed and may also be locked to the bottle holder. The container's shape is such that it can stand vertically or horizontally, opened or closed on a flat surface, such as the ground or a tabletop.

However, these patents fail to provide an efficient removable storage compartment system for bicycles which is easy to use and efficient as is described in the present application. Further, these patents fail to provide removable storage compartment system having individual compartments which may be secured to each other or to the frame of a bicycle.

SUMMARY OF THE INVENTION

A removable storage compartment system for bicycles is provided. The removable storage compartment system has a plurality of generally cylindrical containers wherein each of the individual containers is secured to another container or to the frame of the bicycle. The generally cylindrical individual containers may be insulated so as to allow a user to transport warm or cool items. Each of the plurality of individual storage compartments may be of different sizes so as to allow a user to best select the total desired storage area for the bicycle and to allow a user to store the individual storage compartments inside one another.

An advantage of the present removable storage compartment system for a bicycle is that the present removable storage compartment system for a bicycle is lightweight.

Yet another advantage of the present removable storage compartment system for a bicycle is that the present removable storage compartment system may have a reflective material which may increase the visibility of the bicycle rider.

Still another advantage of the present removable storage compartment system for a bicycle is that the present system may have individual storage compartments which are waterproof and resistant to various weather conditions.

And another advantage of the present removable storage compartment system for a bicycle is that the individual storage compartments of the present removable storage compartment system may be insulated and may therein allow a user to transport a warm or cool item, such as a beverage, inside the compartments.

Still another advantage of the present removable storage compartment system for a bicycle is that the present removable storage compartment system allows a user to select an optimal storage compartment capacity for his/her bicycle.

Yet another advantage of the present removable storage compartment system for a bicycle is that the present removable storage compartment system has a first strap and a second strap for securing the individual compartments to the frame or handle bars of the bicycle to avoid unwanted movement of the individual storage compartments during bicycle riding.

An advantage of the present removable storage compartment system for a bicycle is that the present removable storage compartment system may have a removable liquid-tight compartment for storing a drink.

For a more complete understanding of the above listed features and advantages of the removable storage compartment system for a bicycle reference should be made to the detailed description and the drawings. Further, additional features and advantages of the invention are described in, and will be apparent from, the detailed description of the preferred embodiments.

BRIEF DESCRIPTION OF THE DRAWINGS

FIG. 1 illustrates a side view of the individual storage compartments of the system secured to a bicycle frame.

FIG. 2 illustrates front view of the individual storage compartments being used in a vertical orientation.

DETAILED DESCRIPTION OF THE PREFERRED EMBODIMENTS

Figure 3:
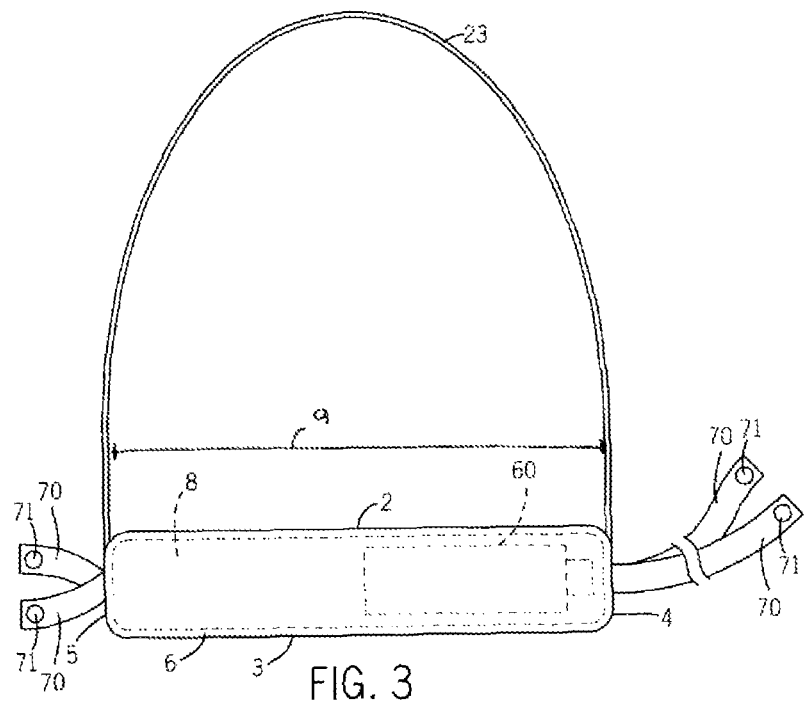
FIG. 3 illustrates a side view of an individual storage compartment having securing straps for securing to a bicycle frame or for carrying once the compartment is removed from the frame of the bicycle and further illustrates a bottle within the interior of the compartment.

A removable storage compartment system for bicycles is provided. The removable storage compartment system has a plurality of generally cylindrical containers wherein each of the individual containers is secured to another container or to the frame of the bicycle. The generally cylindrical individual containers may be insulated so as to allow a user to transport warm or cool items. Each of the plurality of individual storage compartments may be of different sizes so as to allow a user to best select the total desired storage area for the bicycle and to allow a user to store the individual storage compartments inside one another.

Referring first to FIG. 1, a removable storage compartment system 1 for a bicycle 100 is provided. The removable storage compartment system 1 has a plurality of individual storage compartment units: 10A, 10B, 10C and 10D are illustrated. It should be noted that although the figures generally illustrate four individual storage compartment system units (or two in FIG. 6), any number of individual storage compartment units may be used. In an embodiment, the individual storage compartment units 10A, 10B, 10C or 10D may be stored vertically with respect to one another (see FIGS. 1 and 2).

In an embodiment, at least a portion of the individual storage compartment units 10A, 10B, 10C or 10D may have a reflective surface 78 (FIG. 2) which allows a bicycle rider to be more easily seen in diminished lighting. Further, in an embodiment, a flashing light 16 (FIG. 2) may be located on the device 1 to allow the rider to have increased visibility in diminished lighting. The storage compartments 10A, 10B, 10C or 10D are especially suitable for storing, for example, standard and tall boy 24 oz cans. As a result, the compartments 10A, 10B, 10C or 10D may act as a kozzie for the items located inside the individual compartments 10A, 10B, 10C or 10D. Further, a kozzie may be placed around a can and then the can inserted into the individual compartments 10A, 10B, 10C or 10D for a snug and secure fit.

Each of the individual storage compartment system units 10A, 10B, 10C and 10D may each have a top 2, a bottom, 3, a front 4, a back 5 (FIG. 3), an exterior side 6, and a generally hollow interior 8. Further, the distance between the front 4 and the back 5 of each of the individual compartment units 10A, 10B, 10C and 10D may define a length 9 (FIG. 3). In an embodiment, the individual storage compartment system units 10A, 10B, 10C and 10D may be generally made of, for example, a slightly flexible material. In an embodiment, the individual storage compartment units 10A, 10B, 10C or 10D may be constructed in part of vinyl and/or aluminum so as to better protect the items (such as water bottles, maps, bicycle accessories, phones, etc) located within the interior 8 of the compartments 10A, 10B, 10C and 10D. Further, in an embodiment, the compartments 10A, 10B, 10C and 10D may be insulated and largely water-proof so as to be able to withstand various harsh weather conditions and further to maintain the temperature of the objects located within the compartments 10A, 10B, 10C and 10D.

In an embodiment, a first individual storage compartment unit 10A may have a concave top 2 extending the entire length 9 of the first individual storage compartment 10A and a rounded bottom 3 (FIG. 2). The concave top 2 of the first unit 10A may allow the first unit 10A to be secured to the (generally rounded) main frame 20 of a bicycle 100 in a generally flush manner. In particular, the top 2 of the first unit 10A may align with and may be secured to the bottom of a main frame member 20 of the bicycle 100. The curvature of the concave top 2 of the first unit 10A is preferably similar to the curvature of the bottom of the main frame 20 of the bicycle 100. The bottom 3 of the first unit 10A may be generally rounded. The generally rounded bottom 3 portion of the first unit 10A may have a curvature similar to the curvature of the top 2 of the second unit 10B. In an embodiment, the device 1 may be secured to the handle bars of a bicycle 100 as opposed to the main frame member 20. Attaching the device 1 to the handle bars may allow a user to access the items located on the inside of the device 1 while still ridding.

Figure 6:
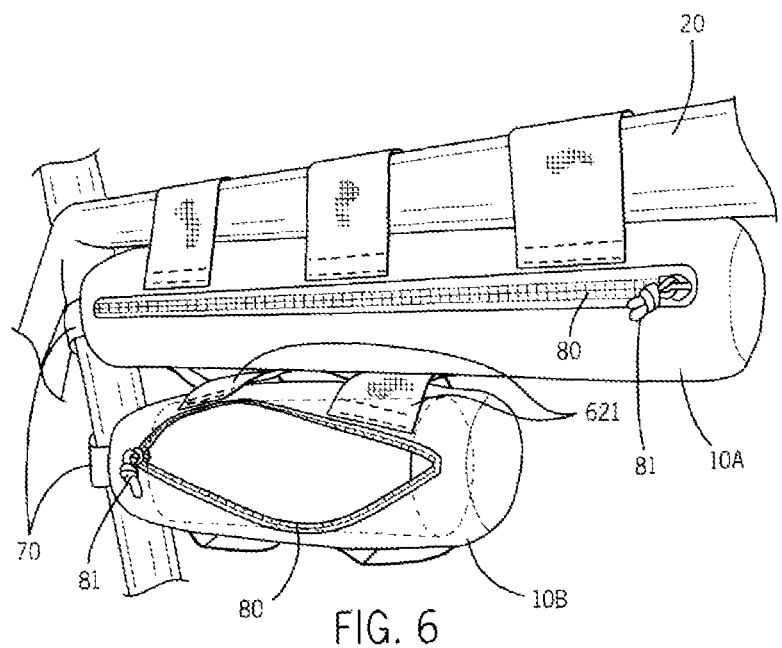
FIG. 6 illustrates a side perspective view of an alternative embodiment of the individual storage compartments wherein the individual storage compartments have a fastener (in this case a zipper) secured to the side of the individual compartments as opposed to the ends of the compartment as is illustrated in FIG. 2.

In an embodiment, at least one of the individual storage compartment units 10A, 10B, 10C or 10D may have a securing strap 70 which secures the device 1 to the frame 20 of the bicycle 100. The securing strap 70 may located at the front 4 and the back 5 of one of the individual storage compartment units 10A, 10B, 10C or 10D and may have a securing mechanism 71 (such as a button, hook and loop fastener or the like) which secures around a portion of the frame 20 of the bicycle 100 and prevents the device 1 from shifting during use of the bicycle 100. The securing strap 70 may be lined for extra durability and comfort. In an alternative embodiment as illustrated in FIG. 6, securing straps 621 may be located on the exterior side 6 and/or top 2 of the compartments in addition to or instead of the front 4 and/or back 5.

In an embodiment, the front 4 (for example) of the individual storage compartment units 10A, 10B, 10C or 10D may have an opening flap 80 (FIG. 2) which may be opened by, for example, a zipper 81. The opening flap 80 may allow a user to gain access to the generally hollow interior 8 of the individual storage compartment units 10A, 10B, 10C or 10D. Items 60 may be store within the interior 8 of each of the individual storage compartment units 10A, 10B, 10C, 10D. For example, the items 60 may be a bottle of water, food, keys, clothing, camping gear, bicycle maintenance equipment or the like. Once the item 60 is placed inside the interior 8 of the device 1, the opening flap 80 may be secured by the zipper 81 so that the item 60 does not fall out during the operation of the bicycle 100.

In an alternative embodiment, the top 2 of each of the individual storage compartment units 10A, 10B, 10C or 10D may have a magnet 90 (FIG. 2). The magnet 90 may be attracted to a second magnet 91 located on the bottom 3 of the unit directly above the unit. As a result, the plurality of individual storage compartment units 10A, 10B, 10C or 10D may be secured to each other. In another embodiment, another securing device 1 such as, for example, a hook and loop fastener system or buttons may be used to secure the bottom 3 of a first individual storage compartment unit 10A, 10B, 10C or 10D to the top 2 of a second individual storage compartment unit 10A, 10B, 10C or 10D. In an embodiment, the top 2 of the first compartment 10A may have magnet 90 which is attracted to the frame 20 of the bicycle and helps secure the device 1 to the bicycle 100.

As stated above, in an embodiment, the individual storage compartment units 10A, 10B, 10C or 10D may be stored vertically with respect to one another (see FIGS. 1 and 2). The individual storage compartment units 10A, 10B, 10C or 10D may get smaller in both diameter and in overall length 9 (FIG. 3) the closer each unit gets to the ground. For example, unit 10A is larger diameter-wise and length-wise 9 than unit 10B which is larger than unit 10C, etc. Providing the individual storage compartment units 10A, 10B, 10C or 10D with a smaller overall length 9 and diameter the closer a unit is to the ground accommodates for the decreased space in the frame 20 of the bicycle 100 by the presence of the angled bar 26 (FIG. 1) of the frame 20.

Figure 4:
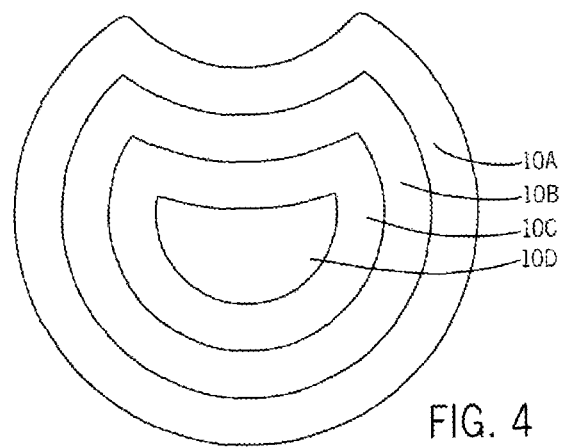
FIG. 4 illustrates a front view of the individual storage compartments stored within each other in an embodiment.

Providing a smaller diameter and length 9 for each individual storage compartment units 10A, 10B, 10C or 10D the closer you get to the ground also allows for the smaller storage units 10A, 10B, 10C and 10D to be inserted into the larger individual storage compartment units 10A, 10B, 10C, 10D (See FIG. 4) similar to storing Russian dolls when the device is not being used.

In an embodiment, at least one of the individual storage compartment units 10A, 10B, 10C or 10C may have a shoulder strap 23 (FIG. 3). The shoulder strap 23 may allow the device 1 to be removed from the bicycle 100 and carried by the person while, for example, the person is on a hike or walking. The device 1 may then be reinserted onto the bicycle 100 after use.

Figure 5:
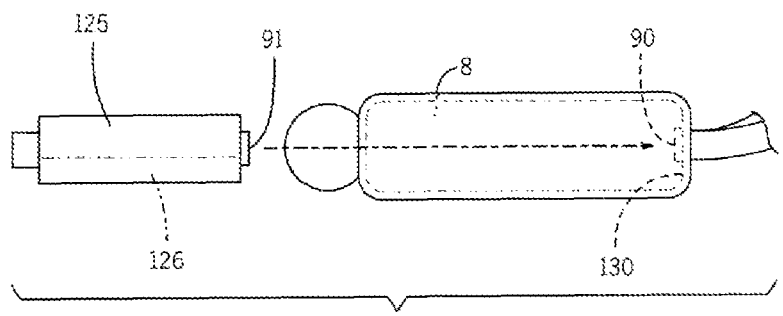
FIG. 5 illustrates an embodiment wherein a removable liquid-tight container for storing a beverage is located within the interior of one of the individual storage compartments and wherein magnets are used to help secure the removable liquid-tight container within the interior of the individual compartment.

Referring now to FIG. 5, in an embodiment, the device 1 may have a removable liquid-tight compartment 125 for storing a beverage 126. The removable liquid-tight compartment 125 may be especially suitable for storing water, a sports drink or the like for the rider of the bicycle 100. In an embodiment, the removable liquid-tight compartment 125 may be generally made of a durable, but flexible plastic material such as a strong plastic bag or bottle. The removable liquid-tight storage compartment 125 may be filled by, for example, a standard water bottle so as the ridder may be hydrated during riding the bicycle 100. In an embodiment, the liquid-tight storage compartment 125 may be generally cylindrical, having a magnet 91 located at a distal end which lightly secures the liquid-tight storage compartment 125 to a corresponding magnet 90 on an interior wall 130 of one of the compartments 10A, 10B, 10C or 10D.

Finally, referring now to FIG. 6, in an embodiment, the compartments 10A, 10B, 10C or 10D may have a securing device 80 located on the side 6 of the compartments 10A, 10B, 10C and 10D. In this embodiment, a user may more easily access items 60 located within the generally hollow interior 8 of the compartment 10A, 10B, 10C and 10D without the need to remove the compartment 10A, 10B, 10C or 10D from the main frame 20 of the bicycle 100.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:
1. A removable storage system for a bicycle comprising:
    a bicycle having a frame;
    a first compartment housing have a top, a bottom, a front, a back, a side, a length defined by the distance from the front to the back and a generally hollow interior capable of storing an item;
    a second compartment housing have a top, a bottom, a front, a back, a side, a length defined by the distance from the front to the back and a generally hollow interior capable of storing an item;
    at least one strap secured to the first compartment wherein the first strap is capable of removably securing the first compartment to a frame of a bicycle;
    at least one strap secured to the second compartment wherein the second strap is capable of removably securing the second compartment to the first compartment;
    an opening on the first compartment and an opening on the second compartment wherein the opening on the first compartment and the opening on the second compartment extends into the generally hollow interior of the first compartment and the second compartment and wherein an item may be stored within the interior of the first compartment and within the interior of the second compartment;
    wherein the top of the first compartment has a concave portion extending the entire length of the first compartment wherein the concave portion has an arch substantially similar to an arch of the frame of the bicycle such that a portion of the frame of the bicycle is secured within the concave portion of the top of the first compartment; and
    wherein the top of the second compartment has a concave portion extending the entire length of the second compartment wherein the concave portion of the top of the second compartment has an arch substantially similar to the bottom surface of the first compartment such that a portion of the bottom surface of the first compartment is secured within the concave portion of the top of the second compartment.

2. The removable storage system for a bicycle of claim 1 wherein the length of the first compartment is greater than the length of the second compartment.

3. The removable storage system for a bicycle of claim 1 further comprising:
    a movable flap at the opening of the first compartment wherein the removable flap temporarily prevents access to the generally hollow interior of the first compartment and wherein the movable flap is secured to the opening of the first compartment by a zipper or hook and loop fastener.

4. The removable storage system for a bicycle of claim 1 wherein the first compartment and the second compartment are waterproof.

5. The removable storage system for a bicycle of claim 1 wherein the first compartment and the second compartment are insulated.

6. The removable storage system for a bicycle of claim 1 further comprising:
    a bottle for storing a liquid;
    a magnet secured within an inner wall of the first compartment; and
    a corresponding magnet secured to the bottle for storing a liquid wherein the magnet of the inner wall of the first compartment temporarily secures the bottle within the generally hollow interior of the first compartment.

7. The removable storage system for a bicycle of claim 1 further comprising:
    a diameter of the first storage compartment; and
    a diameter of the second storage compartment wherein the diameter of the second storage compartment is less than the diameter of the first storage compartment so as to allow the second storage compartment to be stored within the generally hollow interior of the first storage compartment.

8. The removable storage compartment of claim 1 further comprising:
    a third storage compartment wherein the third storage compartment is capable of being temporarily secured to the second storage compartment.

9. A removable storage system for a bicycle comprising:
a bicycle having a frame;
a first compartment housing have a top, a bottom, a front, a back, a side, a length defined by the distance from the front to the back and a generally hollow interior capable of storing an item;
a second compartment housing have a top, a bottom, a front, a back, a side, a length defined by the distance from the front to the back and a generally hollow interior capable of storing an item;
at least one strap secured to the first compartment wherein the first strap is capable of removably securing the first compartment to a frame of a bicycle;
at least one strap secured to the second compartment wherein the second strap is capable of removably securing the second compartment to the first compartment;
an opening on the first compartment and an opening on the second compartment wherein the opening on the first compartment and the opening on the second compartment extends into the generally hollow interior of the first compartment and the second compartment and wherein an item may be stored within the interior of the first compartment and within the interior of the second compartment; and
a bottle for storing a liquid;
a magnet secured within an inner wall of the first compartment; and
a corresponding magnet secured to the bottle for storing a liquid wherein the magnet of the inner wall of the first compartment temporarily secures the bottle within the generally hollow interior of the first compartment.

\* \* \* \* \*